Sept. 4, 1923.　　　　　　　　　　　　　　　　　1,467,016
R. TESORO
CRANK FOR INTERNAL COMBUSTION MOTORS
Filed Feb. 10, 1923
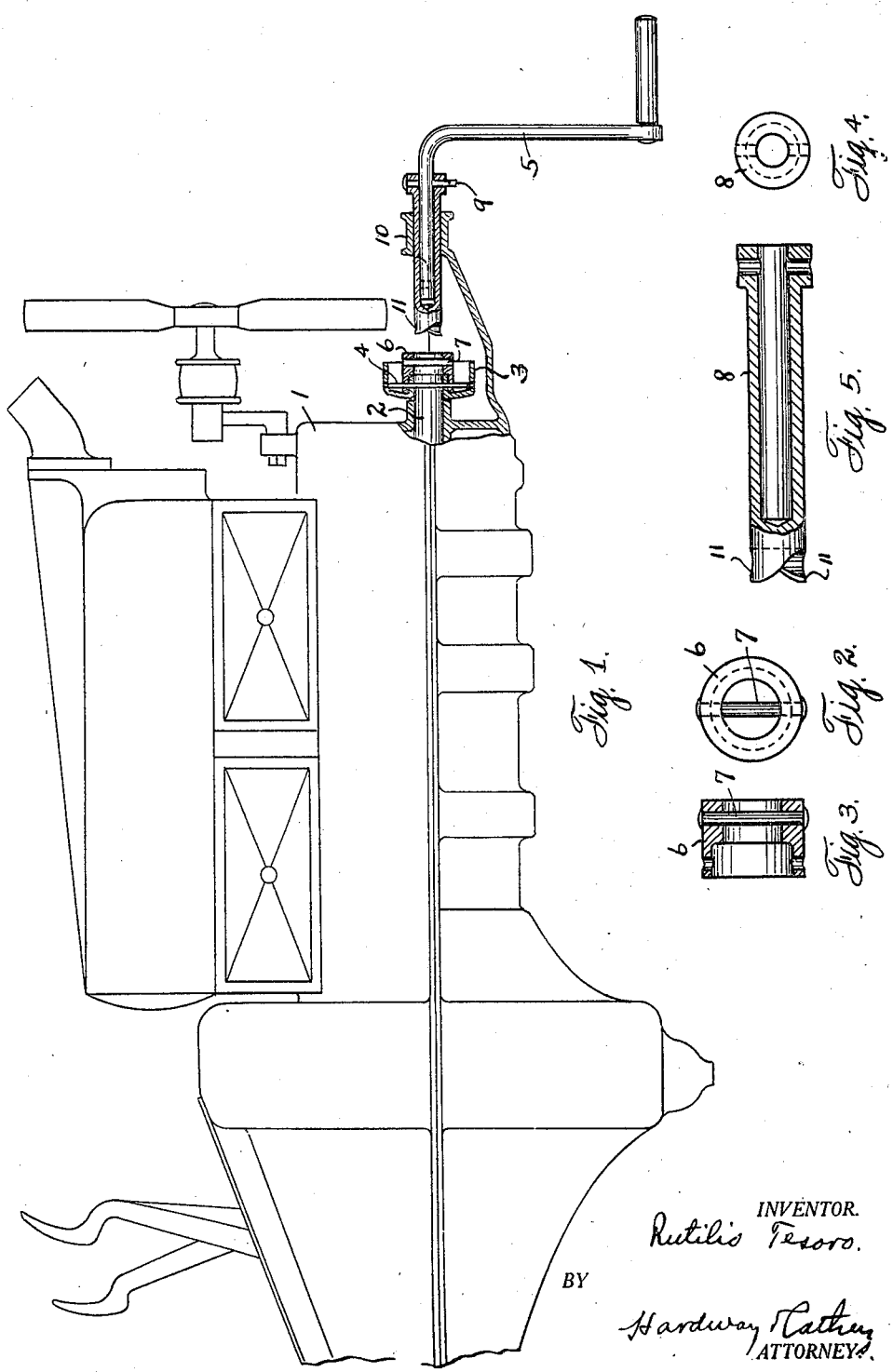

Patented Sept. 4, 1923.

1,467,016

UNITED STATES PATENT OFFICE.

RUTILIO TESORO, OF HOUSTON, TEXAS.

CRANK FOR INTERNAL-COMBUSTION MOTORS.

Application filed February 10, 1923. Serial No. 618,221.

*To all whom it may concern:*

Be it known that I, RUTILIO TESORO, a citizen of the United States, residing at Houston, in the county of Harris and State of Texas, have invented certain new and useful Improvements in Cranks for Internal-Combustion Motors, of which the following is a specification.

This invention relates to new and useful improvements in a crank for internal combustion motors.

One object of the invention is to provide a crank of the character described specially designed for cranking motors of Ford automobiles, and which can be removed when not in use so that it will not rattle or become broken.

As at present constructed the inner end of the crank of the Ford automobile has an enlarged crank ratchet pinned thereto, and said crank works through a sleeve at the front end of the casing, and the ratchet is considerably larger than the sleeve so that the crank can not be withdrawn, but is always in position for use, and in case of an accident the crank usually strikes the object in front of the vehicle and is bent or broken. It is the object of this invention to provide a crank for Ford automobiles that can be readily removed when not in use and can be easily applied when it is desired to crank the motor.

With the above and other objects in view the invention has particular relation to certain novel features of construction, operation, and arrangement of parts, an example of which is given in this specification and illustrated in the accompanying drawings, wherein:—

Figure 1 shows a side view of a motor partly in section, and showing my improved form of crank applied thereto.

Figure 2 shows an end view of the starting pin sleeve employed.

Figure 3 shows a sectional view thereof.

Figure 4 shows a front end view of the crank sleeve and,

Figure 5 shows a sectional view thereof.

In the drawings the numeral 1 designates the motor as a whole having the usual crank shaft 2, to the front end of which the fan belt pulley 3 is pinned by means of the pin 4. The numeral 5 designates the crank. As now constructed the inner end of the crank has an enlarged ratchet pinned thereto which works over the hub of the drive pulley and engages with the pin 4, when the crank is used to start the motor. This ratchet is so large that the crank can not be withdrawn through the crank sleeve. I have dispensed with this ratchet and have fitted over the hub of the pulley 3, a crank pin sleeve 6 which is pinned to said pulley by the pin 4. As shown in Figures 4 and 5 this sleeve is provided with a starting pin 7. I have fitted onto the inner end of the crank 5 a crank sleeve 8 which is pinned thereon by means of the pin 9. This sleeve works through a bearing 10, as shown and its inner end is of a size to fit within the sleeve 6, and has the ratchet teeth 11 adapted to engage with the starting pin 7, and by turning the crank 5 the crank shaft 2 may then be turned and the engine started. The crank may then be readily withdrawn and carried about the vehicle and will not be bent or broken should the vehicle hit an obstruction.

What I claim is:—

1. A starting device for internal combustion motors including a crank, a sleeve pinned to the inner end of said crank and formed with ratchet teeth, and a sleeve pinned to the adjacent end of the crank shaft and adapted to receive said crank sleeve, said ratchet teeth being adapted to engage with the crank shaft pin.

2. A starting device for internal combustion motors including a crank, a sleeve fitted over the inner end of the crank and pinned thereto, whose inner end is formed with ratchet teeth, a sleeve pinned to the crank shaft of the motor and formed to receive said crank sleeve, a pin carried by said crank shaft sleeve and arranged to be engaged with said ratchet teeth during the operation of said crank.

3. A starting device for internal combustion motors including a crank, a sleeve fitted over the inner end of the crank, means for securing said sleeve against rotation relative to the crank, ratchet teeth carried by the inner end of said sleeve, a crank shaft sleeve secured to the front end of the crank shaft of the motor and means carried by said crank shaft sleeve and positioned to be engaged by said ratchet teeth during the operation of the crank.

4. A starting device for internal combustion motors, including a crank, a sleeve fitted over the inner end of the crank, means for securing said sleeve against rotation relative to the crank, a crank shaft sleeve secured to the front end of the crank shaft, interengaging means carried by the respective sleeves through which the crank is engaged with the crank shaft during the operation of the crank.

In testimony whereof I have signed my name to this specification in the presence of two subscribing witnesses.

RUTILIO TESORO.

Witnesses:
W. H. DUNLAY,
E. V. HARDWAY.